United States Patent [19]
Hüneke

[11] 4,249,631
[45] Feb. 10, 1981

[54] AXLE FOR MOTOR VEHICLES

[75] Inventor: Walter Hüneke, Mannheim, Fed. Rep. of Germany

[73] Assignee: Deere & Company, Moline, Ill.

[21] Appl. No.: 39,036

[22] Filed: May 14, 1979

[30] Foreign Application Priority Data

May 13, 1978 [DE] Fed. Rep. of Germany ....... 2821178

[51] Int. Cl.³ ........................ B60K 17/32; B60K 23/04
[52] U.S. Cl. .................................... 180/255; 180/73 C
[58] Field of Search ............... 180/73 D, 73 C, 73 R, 180/71, 54 F, 297, 253, 254, 255, 256, 257, 258, 264, 265, 266, 267, 75

[56] References Cited

U.S. PATENT DOCUMENTS

| 2,053,869 | 9/1936 | Haltenberger | 180/73 C |
| 2,334,980 | 9/1942 | Allen | 180/43 |
| 4,069,887 | 1/1978 | Koepfli | 180/257 |
| 4,081,049 | 3/1978 | Youmans | 180/73 D |

FOREIGN PATENT DOCUMENTS

2550993 5/1977 Fed. Rep. of Germany ........ 180/73 D

Primary Examiner—John J. Love
Assistant Examiner—Randall A. Schrecengost

[57] ABSTRACT

A drive axle assembly for steerable wheels which is pivotally mounted on the frame of a motor vehicle and has two drive shafts in a single axle housing, the shafts angled with respect to each other so that they form a V-shaped configuration opening downwardly and rearwardly to increase the distance between the underside of the axle housing and the ground while maintaining the improved steering capabilities of a swept-back design. The assembly includes a differential having an output axially aligned with and connected directly to one of the drive shafts. The differential is driven by a pinion gear connected to a non-articulated shaft which extends from a transmission and is mounted for rotation about an axis corresponding to the pivotal axis of the assembly so that no universal joint is required between the transmission and differential. The other drive shaft is connected through a universal joint to the differential.

17 Claims, 3 Drawing Figures

AXLE FOR MOTOR VEHICLES

BACKGROUND OF THE INVENTION

The invention relates generally to a steerable drive axle for a motor vehicle and more specifically to such an axle having increased ground clearance and requiring few universal joints.

In order to equip motor vehicles with a steerable drive axle wherein two drive shafts are arranged in a single axle housing, the two shafts are angled rearwardly with respect to a horizontal plane so the vehicle's wheelbase will be decreased for a shorter turning radius and the front-end width will be reduced. The two drive shafts are connected to a differential, each through a universal joint, such that a transversely continuous drive assembly is formed having a V-shaped configuration which opens rearwardly. The end of each drive shaft carries a universal joint which in turn is connected to the axle shaft of a corresponding wheel assembly. The wheel assembly is connected to the axle housing for pivoting about a substantially vertical axis by a steering mechanism. A differential is located at the point of the V-shaped configuration, and the centerline of the differential is generally on the same level as the centerline of the wheels connected to the drive axles. Ground clearance between the wheels is therefore limited by the wheel centerline, and one or more universal joints are commonly required between the transmission and the differential.

BRIEF DESCRIPTION OF THE INVENTION

It is therefore an object of this invention to provide an improved drive axle assembly for steerable wheels.

It is a further object of this invention to provide an improved drive axle assembly having increased ground clearance.

It is another object to provide a simplified drive axle assembly having drive shafts angled with respect to each other to provide improved ground clearance while reducing the number of articulated shafts required in the assembly.

It is still another object of this invention to provide a drive axle for steerable wheels which has relatively few universal joints, with the drive shafts arranged in the axle housing in such a manner that increased ground clearance can be achieved while maintaining a swept-back configuration.

A drive axle is provided having two axle or drive shafts connected to a differential in such a manner that only one universal joint is required. In a horizontal plane, the two shafts are angled with respect to each other in a V-shaped configuration opening rearwardly to provide a large steering angle. In a generally vertical plane, the two drive shafts are angled with respect to each other in a V-shaped configuration opening downwardly to achieve increased ground clearance. Since the shafts are angled toward each other with respect to both a vertical and a horizontal plane, the differential can be arranged substantially higher than with vehicles using standard drive axles while maintaining a swept-back configuration for better steering and turning characteristics. Because of the favorable arrangement of the differential it is possible to connect a pinion gear on the main drive shaft from the transmission directly with the ring gear of the differential thereby eliminating one or more universal joints between the transmission and differential. The differential is carried on the vehicle frame so that one of its bevel or differential side gears is mounted coaxially with and directly drives an axle shaft without need for a universal joint. The opposite axle shaft is connected to the differential through a universal joint. Therefore because of the favorable arrangement of the differential and axle shafts, a minimum number of universal joints is needed. The present layout allows the main drive shaft from the transmission to be coextensive with the pivotal axis of the drive axle.

These and further objects, features and advantages of the present invention will become apparent from the description which follows and from the drawings.

DESCRIPTION OF THE PREFERRED EMBODIMENT

Figure 1:
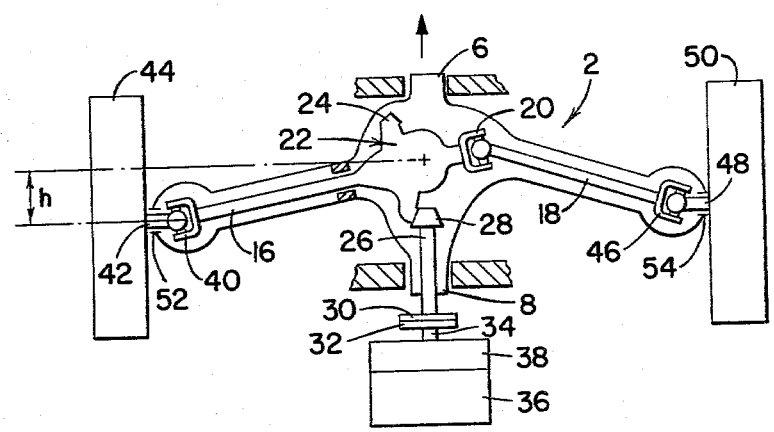
FIG. 1 is a schematic representation of a steerable drive axle for a motor vehicle as viewed from the top.
Figure 2:
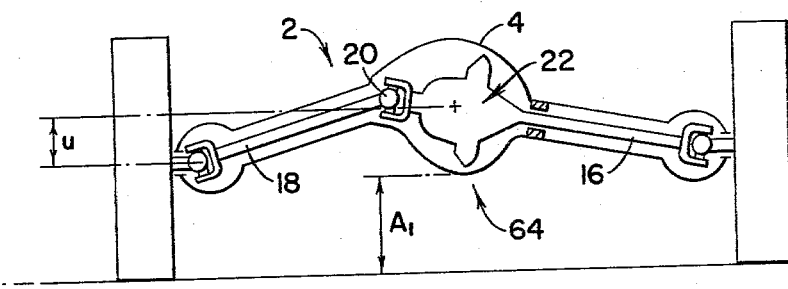
FIG. 2 is a front view of the drive axle shown in FIG. 1.

Referring now to the drawings, a drive axle 2 is depicted schematically and has an axle housing 4 with two pivots 6 and 8 extending in the direction of travel. In order to position the pivots 6 and 8 on the vehicle or tractor frame or body 10, bearings 12 and 14 (FIG. 3) are provided. Located within the axle housing 4 are axles or drive shafts 16 and 18. A single universal joint 20 connects the shaft 18 with a differential 22 which is supported within the housing 4. The differential 22 includes a standard ring gear 24 with bevel pinions and a pair of bevel or differential side gears (not shown) of a conventional type. As best seen in FIGS. 1 and 2, the differential 22 is carried within the housing so that the left axle shaft 16 is axially aligned with the corresponding differential output, which typically can be one of the differential side gears, so that no universal joint is required to drivingly connect the right-hand shaft with the differential. Since the differential 22 is of a conventional type well known to those skilled in the art, it has been described only to the extent necessary to show its location relative to the other parts of the axle assembly.

The axle shafts 16 and 18 are driven by the differential which includes a pinion gear 28 carried by a shaft 26. The shaft 26 extends through the pivot 8 of the axle housing 4 and carries a flange 30 which is drivingly connected to a flange 32 on a main drive shaft 34. An internal combustion engine 36 is connected to a transmission 38 which drives the main drive shaft 34.

The outer ends of the axle shafts 16 and 18 are connected with drive axles 42 and 48 of wheels 44 and 50 by universal joints 40 and 46. Near the universal joints the drive axles 42 and 48 are carried by ball bearings 52 and 54, respectively, contained in the axle housing 4. The above-described wheel assemblies can also include a conventional steering mechanism (not shown) which allows the vehicle to be turned from the forward direction of travel indicated by the arrow in FIGS. 1 and 3. Such steering mechanisms are well known to those skilled in the art and therefore are not described in detail here.

As seen in FIG. 1, the axle shafts 16 and 18 converge forwardly to form a rearwardly opening V-shaped member. In a substantially vertical plane (FIG. 2) the two shafts form an angle which opens downwardly.

This arrangement makes it possible to increase the distance, specified by $A_1$, between the underside 64 of the axle housing 4 and the ground.

Figure 3:
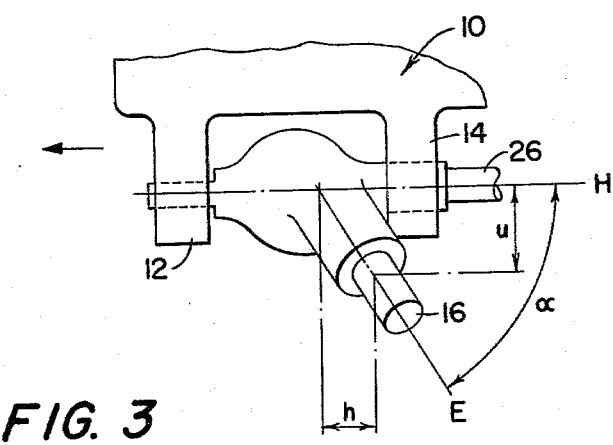
FIG. 3 is a side view of the drive axle shown in FIG. 1.

As best seen in FIG. 3, the axle shaft 16 (and likewise the shaft 18 which is not shown) is angled downwardly as well as rearwardly. An inclined plane E which passes through both axle shafts 16 and 18 and a horizontal plane H which passes through the midpoint of the differential 22 intersect at an acute angle $\alpha$ which opens in the rearward direction. The distance h specifies the rearward slant of the axle shafts 16 and 18, whereby the distance h is measured between the midpoint of the differential 22 and the midpoint of the drive axles 42 and 48 (FIG. 1). The distance u specifies the downward slant of the axle shafts 16 and 18. The distance u is measured between the two above-mentioned midpoints also. Because of the slant of the axle shafts 16 and 18 which raises the differential 22, the distance between the ground and the vehicle is increased by the value u. As a result of the rearward slant of the differential 22 the wheelbase of the tractor is decreased by the value h. At the same time the above-described layout provides a more favorable arrangement of the differential 22 since it is now in direct drive connection with the pinion gear 28 on the shaft 26. Therefore, between the shaft 34 and the differential 22 at least one universal joint can be eliminated.

Having described the preferred embodiment it will be apparent to one skilled in the art that various modifications may be resorted to without departing from the spirit of the invention. Therefore the disclosure should not be taken to limit the invention beyond the broad concepts set forth in the appended claims.

I claim:

1. A drive axle for steerable wheels of a motor vehicle having a frame and an engine-driven transmission and adapted for movement in a forward direction, comprising: an axle housing, a pair of drive shafts rotatably carried in the housing, a differential supported in the housing and drivingly connected to the shafts, means drivingly connecting the transmission with the differential wherein the two shafts are angled with respect to each other such that in a generally horizontal plane they form a rearwardly open angle and in a generally upright plane they form a downwardly open angle, and means rockably connecting the axle housing to the frame for pivoting about a fore-and-aft extending axis.

2. The drive axle as set forth in claim 1 wherein the means drivingly connecting comprises a non-articulated shaft extending from the transmission and wherein the differential includes a first output member axially aligned with and connected to one of the drive shafts and also includes a ring gear, the non-articulated shaft carrying a pinion gear mounted for rotation therewith and in direct driving relation with the ring gear.

3. The drive axle as set forth in claim 2 wherein the other axle shaft is drivingly connected to the differential by a single universal joint offset laterally with respect to the axis of the non-articulated shaft, and wherein the axis of the non-articulated shaft and the fore-and-aft axis are located on the centerline of the vehicle.

4. The drive axle as set forth in claims 1 or 2 further including a universal joint connected near the end of each drive shaft, and a pair of wheel assemblies, each having an axle connected to one of said universal joints.

5. The drive axle as set forth in claim 2 wherein said fore-and aft axis is axially aligned with the non-articulated shaft.

6. The drive axle as set forth in claims 1, 2, or 5 wherein the drive shafts and differential are so arranged that a horizontal plane passing through the midpoint of the differential and an inclined plane passing through the centers of both the drive shafts intersect at an acute angle opening in the rearward direction.

7. In a vehicle having a frame, an engine and drive wheels, a steerable drive axle assembly operably connecting the engine and wheels to move the frame forwardly over the ground, comprising:

a differential pivotally carried by the frame and rockable about a first axis;

first and second axles operably connected to and rockable with the differential about the first axis and extending generally outwardly from the differential in opposite directions, said axles being arranged in a generally V-shaped configuration opening downwardly and rearwardly and terminating at their outer ends below a horizontal plane passing through the center of the differential;

means for drivingly connecting the wheels to the first and second axles; and drive means connecting the differential to the engine.

8. The drive axle as set forth in claim 7 wherein the differential includes first and second outputs, the differential being carried by the frame so that the first output is axially aligned with and non-articulately connected to the first axle, the second output being articulately connected to the second shaft.

9. The drive axle as set forth in claim 7 wherein the differential includes an output member mounted for rotation about an axis corresponding to the axis of one of the axles, and wherein the axle assembly further comprises a universal joint drivingly connecting the other axle with the differential.

10. The drive axle as set forth in claim 9 wherein the differential includes a ring gear and the drive means comprises a non-articulated drive shaft extending in the fore-and-aft direction from the engine and a gear mounted on the end of the shaft meshing with the ring gear, and wherein the first axis and the drive shaft are in axial alignment.

11. The drive axle as set forth in claim 10 wherein the differential is pivotally mounted on the frame for rocking about the axis of the drive shaft.

12. In a vehicle having an engine driven transmission, a frame, and steerable traction wheels for propelling the vehicle over the ground generally in the forward direction, a drive assembly for the steerable wheels comprising:

a differential having a housing pivotally carried by the frame for rocking about a fore-and-aft extending axis and including a differential output rotatable in the housing about a first axis extending generally outwardly and sloping downwardly and rearwardly from the differential;

a first axle, supported in the housing and rockable therewith, connected to the differential output for rotation about the first axis;

a second axle supported in the housing and connected to the differential output, said second axle extending generally outwardly in the opposite direction from the first axle and sloping downwardly and rearwardly, wherein said first and second axles are angled with respect to each other to form a downwardly and rearwardly opening V-shaped configuration terminating in outwardly extending ends;

means drivingly connecting the wheels to the outwardly extending ends of the axles;

a drive shaft extending from the transmission; and a drive gear carried by the drive shaft and in driving relation with the differential.

13. The drive axle as set forth in claim 12 wherein the second axle is drivingly connected to the differential output by a single universal joint and the first axle is directly connected to the output.

14. The drive axle as set forth in claim 12 or 13 wherein the means drivingly connecting the wheels to the axles comprise a universal joint connected between each outwardly extending end and a corresponding wheel.

15. The drive axle as set forth in claim 12 or 13 wherein the differential output is non-articulately connected to the first axle.

16. The drive axle as set forth in claim 12 wherein the drive shaft comprises a non-articulated shaft member extending between the transmission and the gear and having an axis of rotation axially aligned with the first axis.

17. A drive axle for steerable wheels of a motor vehicle having a frame and an engine-driven transmission and adapted for movement in a forward direction, the drive axle comprising:

a rigid axle housing pivotally connected to the frame and rockable about a fore-and-aft extending pivotal axis located substantially on the centerline of the vehicle;

a drive shaft extending in the fore-and-aft direction and having an axis of rotation corresponding to the pivotal axis drivingly connected near one end to the transmission and carried at its opposite end within the axle housing;

first and second axle shafts supported in the housing and rockable therewith, said axle shafts angled downwardly and rearwardly with respect to each other to form a downwardly and rearwardly open V-shaped configuration and having laterally outward ends drivingly connected to the steerable wheels;

a differential supported within the housing having an input drivingly connected to the drive shaft and having a first output rotatable about an axis corresponding to the axis of the first axle shaft and non-articulatedly connected thereto, the differential also including a second output rotatable about an axis forming an oblique angle with the second axle shaft; and a universal joint offst laterally outwardly from the centerline of the vehicle drivingly connecting the second output to the second axle shaft, and wherein the laterally outward ends of the axle shafts are located below a horizontal plane passing through the center of the differential and rearwardly of a vertical plane passing transversely through the center of the differential.

* * * * *